US010598290B2

(12) United States Patent
Asboth et al.

(10) Patent No.: US 10,598,290 B2
(45) Date of Patent: Mar. 24, 2020

(54) CARTRIDGE PROVIDED WITH ECO FUNCTION FOR A SINGLE-ARMED MIXING FAUCET

(71) Applicant: KEROX Ipari es Kereskedelmi Kft., Soskut (HU)

(72) Inventors: Laszlo Asboth, Halasztelek (HU); Gyorgy Bolgar, Budapest (HU)

(73) Assignee: KEROX Ipari es Kereskedelmi Kft., Soskut (HU)

( * ) Notice: Subject to any disclaimer, the term of this patent is extended or adjusted under 35 U.S.C. 154(b) by 101 days.

(21) Appl. No.: 15/557,863

(22) PCT Filed: Apr. 1, 2016

(86) PCT No.: PCT/HU2016/050011
§ 371 (c)(1),
(2) Date: Sep. 13, 2017

(87) PCT Pub. No.: WO2016/156892
PCT Pub. Date: Oct. 6, 2016

(65) Prior Publication Data
US 2018/0073645 A1 Mar. 15, 2018

(30) Foreign Application Priority Data
Apr. 2, 2015 (HU) .................... 1500146

(51) Int. Cl.
*F16K 11/078* (2006.01)
*F16K 35/04* (2006.01)

(52) U.S. Cl.
CPC ...... *F16K 11/0785* (2013.01); *F16K 11/0787* (2013.01); *F16K 35/04* (2013.01)

(58) Field of Classification Search
CPC ... F16K 11/0785; F16K 11/0787; F16K 35/04
See application file for complete search history.

(56) References Cited

U.S. PATENT DOCUMENTS

| | | | | |
|---|---|---|---|---|
| 5,538,041 A | * | 7/1996 | G anzle | F16K 11/0787 137/625.17 |
| 6,321,789 B1 | * | 11/2001 | Chen | F16K 11/0782 137/625.17 |
| 7,185,676 B2 | * | 3/2007 | Huang | F16K 11/0787 137/625.17 |

(Continued)

*Primary Examiner* — Seth W. MacKay-Smith
(74) *Attorney, Agent, or Firm* — Anthony H. Handal; Melissa A. Tharp; Handal & Morosky

(57) ABSTRACT

A cartridge provided with ECO function for a single-armed mixing faucet, that comprises a cylindrical housing that has a cylindrical inner cavity and wall with a central axis; an arm that can be moved, and an actuator disc connected to the control ceramic disc of a pair of water-mixing ceramic discs, wherein the actuator disc comprises a pair of parallel planar walls extending in radial direction, wherein the spacing between the parallel walls decreases at predetermined distances from the center of rotation of the actuator disc, the cartridge comprises an arced limiting element that has a pair of spaced arms, the limiting element being movable only in radial direction relative to the actuator disc, and the radial position of the limiting element, and the limiting element being movable substantially without any effort.

12 Claims, 5 Drawing Sheets

(56) References Cited

U.S. PATENT DOCUMENTS

| | | | | |
|---|---|---|---|---|
| 7,651,067 B2* | 1/2010 | Schwarzer | ............... | F16K 3/08 |
| | | | | 137/625.17 |
| 2011/0000564 A1* | 1/2011 | Corbin | ............... | F16K 11/0787 |
| | | | | 137/625.4 |
| 2011/0297248 A1* | 12/2011 | Nelson | ..................... | E03C 1/04 |
| | | | | 137/343 |
| 2015/0260307 A1* | 9/2015 | Chen | .................. | F16K 11/0782 |
| | | | | 251/231 |

* cited by examiner

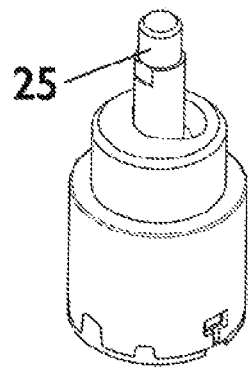
Fig. 10b
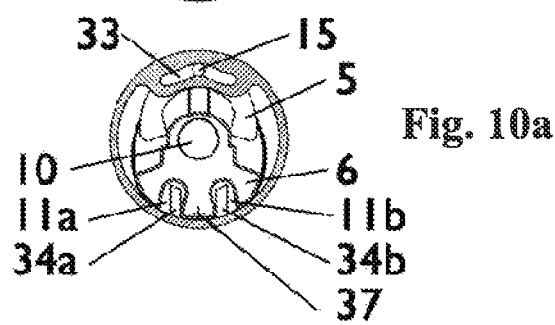
Fig. 10a
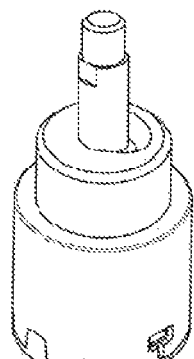 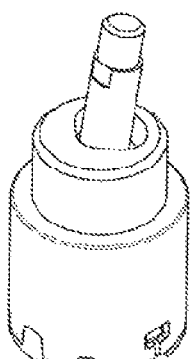 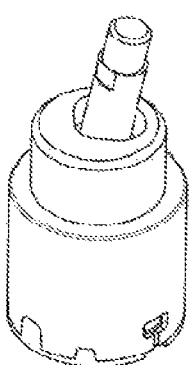
Fig. 11b  Fig. 12b  Fig. 13b
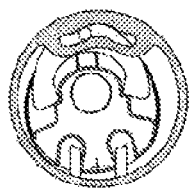 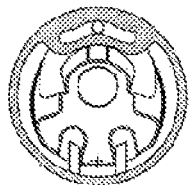 
Fig. 11a  Fig. 12a  Fig. 13a

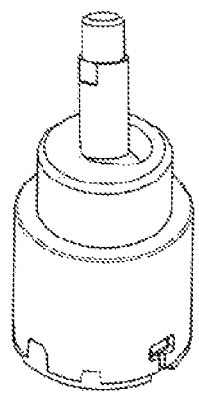
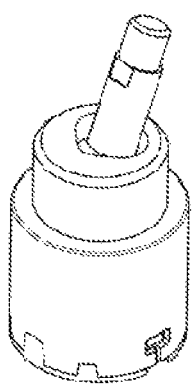
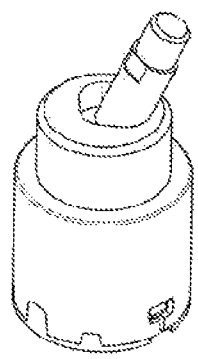
Fig. 14b
Fig. 15b
Fig. 16b
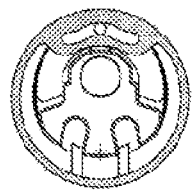
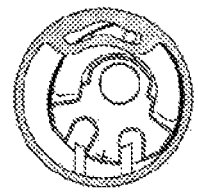
Fig. 14a
Fig. 15a
Fig. 16a

CARTRIDGE PROVIDED WITH ECO FUNCTION FOR A SINGLE-ARMED MIXING FAUCET

The invention relates to a cartridge provided with ECO function for a single-armed mixing faucet that comprises:

- a cylindrical housing that has a cylindrical inner cavity defined by a cylindrical inner wall that has a central axis (26);
- an arm with a first end that extends out of the housing and a second end designed as a shaft, wherein the arm can be moved relative to the housing with at least two degrees of freedom;
- an actuator disc arranged in the housing that can be moved in a plane normal to the axis, a bore is defined in a central portion of a first side of the actuator disc that is open in the direction of the arm and in which the shaft is inserted, whereby the movement of the arm causes movement of the actuator disc in the plane;
- a ceramic control disc arranged at the other side of the actuator disc, and the actuator and control discs are connected to each other, the ceramic control disc has a planar face opposite to the side connected to the actuator disc;
- a ceramic stationary disc having a planar face pressed to the planar face of the control disc so that the planar face of the control disc can be moved along the plane of the faces relative to the stationary disc;
- a base connected to the side of the stationary disc opposite to the planar face, the base has a cold water inlet, a warm water inlet and a mixed water outlet, wherein the actuator disc and the control disc connected thereto can be moved along said plane by the movement of the arm and this movement comprises a circular rotation component around a centre which is close to the inner wall of the housing in a limited angular range and a radial component, wherein the radial component of the movement of the control disc defines the flow rate of the mixed water outflow and the angular position defines the temperature of the mixed water; and
- ECO elements that partially prevent further radial displacement of the control disc after reaching a predetermined radial position.

The movement of the arm of the cartridge around at least two mutually normal axes provides a sufficient comfort for the user to adjust both the flow rate and the temperature of the mixed water. A further comfort can be provided if the movement of the arm is made possible in more than two degrees of freedom in a similar way how joysticks in computer games can be used. Such cartridges are also called as "joystick type cartridges". This statement is especially true in cases in which in the initial position (where no water can flow) the arm lies in the axis of the cartridge.

Cartridges designed in this way provide an appropriate operation, but users tend to adjust the flow rate to its maximum value in each selected temperature, whereby much more water will flow out and arrives at the drain, than actually needed by the user. For the elimination of this problem of excess water usage cartridges with more economic water consumption have been provided which have a so called "ECO function". In such cartridges after a predetermined opening of the control arm can be attained only after overcoming a higher force, i.e. the user can open the cartridge easily only till a predetermined water flow rate, and if he needs a higher flow rate, he can adjust it only after having overcome the resistance at the boundary of the ECO zone.

In DE 4330535 a cartridge provided with ECO function is described, in which at both sides of a movable element respective small springs with C-shape are attached. A drawback of this solution lies in the fact and at predetermined radial positions of the control arm these springs get distorted, and for a further opening of the cartridge the resistance of this spring have to be overcome. In this design it is a drawback that the deformation of the small spring is comparatively high, therefore in case of different products the uniform force demand cannot be ensured. A further problem lies in that the beginning of the ECO function falls to the same radial position of the arm, although cartridges have the flow rate-angular position characteristics in which at different angles different flow rates belong to the same radial position. The document described cannot provide that the same flow rate is associated in all angular positions (temperatures) to the beginning of the ECO function. In the solution described in this document the ECO function cannot be realized when a joystick-type arm is used.

In the document EP 1 672 263 B1 the ECO function is not realized within the cartridge but by separate spring biased buffers placed close to the bottom of the control arm in the faucet. Such a design renders the structure of the faucet complicated, increases the costs and this design is also inappropriate to ensure that the beginning of the eco function belong to the same or substantially the same output flow rate.

The object of the invention is to provide a cartridge that has an arm which can be moved at least with two degrees of freedom, preferably that imitates the movement of joysticks that can provide the ECO function. A further object of the invention is to realize the ECO function in a simple way without the need of increasing the volume of the cartridge. A still further object of the invention is to ensure that the ECO function start depending on the position of the arm always according to the required characteristics e.g. at all arm positions the output flow rate should be nearly the same.

A further object is to provide a cartridge with an ECO function in which the deformation of the flexible element of the structure that has the task of increasing the resistance at the ECO points is relatively much smaller than in case of conventional structures.

According to the invention a cartridge has been provided for single armed faucets that has an ECO function and which is designed as set forth in the attached claims.

The invention will now be described in connection with preferable embodiments thereof in which reference will be made to the accompanying drawings. In the drawing:

FIGS. 10a and 10b show the limiting position of the actuator disc in initial position and show the corresponding perspective view of the cartridge; and FIGS. 11-16 a and b are similar to FIGS. 10a and 10b but show different adjustment positions with the indication of the associated arm position.

Figure 1:
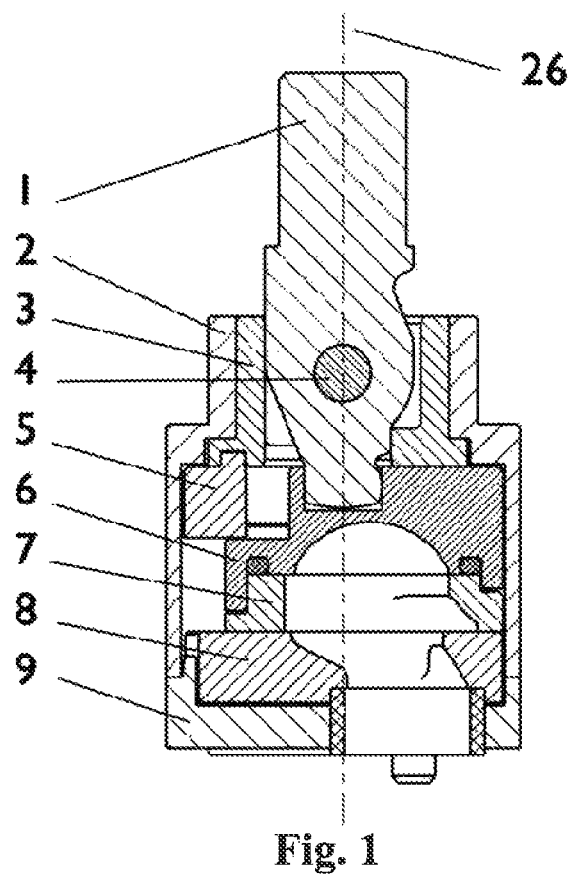
FIG. 1 shows a first embodiment of a cartridge in sectional perspective view.

FIG. 1 shows the sectional view of a first embodiment of the cartridge according to the invention. The cartridge has a circularly symmetrical hollow housing 2 that ends in a narrowing stepped neck. An arm 1 is extending out of the neck of the housing 2 that has a rectangular upper end part that can be form fitted to a handle (not shown) of a faucet in which the cartridge is arranged. The arm 1 can be turned with a predetermined angular range around a shaft 4 which is normal to the axis 26 of the housing (which is vertical in the drawing). In this embodiment an arm support 3 surrounds and holds the arm 1 that allows rotation thereof, and the shaft 4 is pivotally fixed in the arm support 3. Under the arm support 3 an actuator disc 6 is arranged that can be moved in a plane which is normal to the axis 26 as it will be explained at a later part of this specification. The actuator disc 6 has a stepped and partially cut upper part on which a limiting element 5 is supported on which the limiting element 5 can be moved along a guided path. Under the actuator disc 6 a control disc 7 is arranged which is made of a ceramic material and connected to and moved together with the actuator disc 6. The actuator disc 6 and the control disc 7 connected thereto has preferably but not necessarily a substantially circular shape and their diameter is smaller than the internal diameter of the cylindrical cavity of the housing 2, and can be moved together along a plane normal to the axis 26.

The control disc 7 has a carefully ground planar lower surface that is pressed against the upper ground planar surface of stationary disc 8 made also of a ceramic material. The stationary disc has a diameter greater than that of the control disc 7 and it is fixed to the cylindrical interior cavity of the housing 2. The bottom face of the stationary disc is connected to a base 9 which is fixed to the bottom of the housing 2.

It is noted that the control disc 7, the stationary disc 8, the base 9 as well as the portion of the housing 2 that surrounds these elements have a conventional design e.g. as described in HU patent 225 580. From the point of view of the present invention it is sufficient to know about these elements that the base 9 have a cold and a warm water inlet and a mixed water outlet which in installed state are connected to appropriate pipes. When the control disc 7 is moved in the guided plane normal to the axis 26 in radial direction of the stationary disc 8, then in the innermost position (which is the closest to the axis 26) the flow of water is cut between the inlets and the outlet, and when the control disc 7 is moved radially outward from this innermost position, the path of the water gradually opens. When the control disc 7 is displaced in any of the radial positions in tangential direction within a predetermined angular range, then from a central radius of the range in one extreme position only cold water will flow, in the other extreme position only warm water will flow, and in an intermediate angular position the temperature of the mixed water will depend on the angular position i.e. on the distance from the central radius. It should be noted that the angular position versus mixed water temperature function is not linear but preferably symmetric to the central radius.

Figure 2:
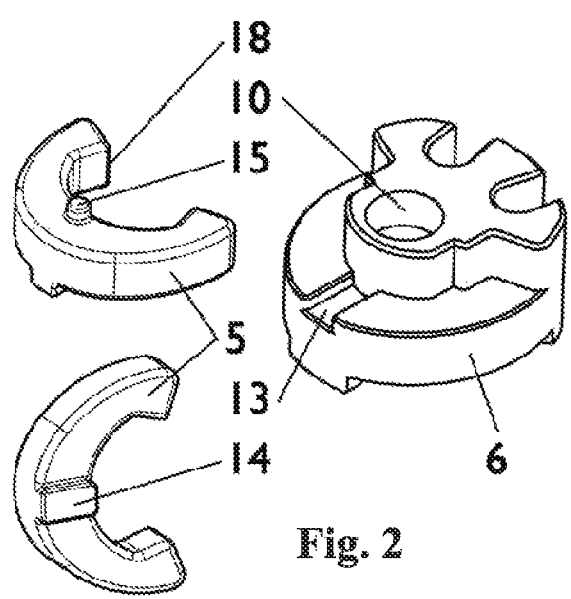
FIG. 2 shows the perspective view of the actuator disc 6 and the limiting element 5 on it.
Figure 3:
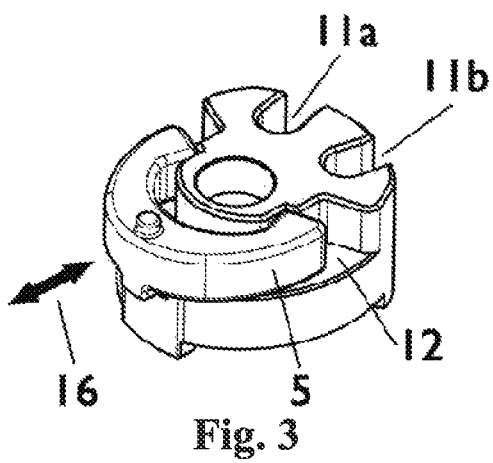
FIG. 3 is a perspective view similar to FIG. 2 that shows the limiting element and the actuator disc in a position at the start of the collision.
Figure 4:
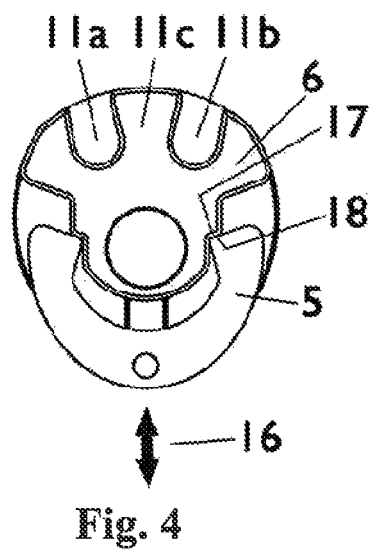
FIG. 4 is a top view that corresponds to FIG. 3.

Reference will be made now to FIGS. 2 to 4. In the exploded view of FIG. 2 the design of the actuator disc 6 and of the limiting element 5 can be observed separately. At the centre of the actuator disc 6 a dead end bore 10 is provided that receives the lower end of the arm 1. The arm 1 can be tilted around the shaft 4 and can be turned around the axis 26 in a predetermined angular range. This movement will be transferred and converted by the connection between the lower end of the arm 1 and the wall of the bore 10 to move the actuator disc 6 along the previously mentioned guided planar path. In the thicker rear part of the actuator disc 6, symmetrically to a central position a pair of guiding slots 11a and 11b are provided which receive ribs 34a and 34b extending out inwardly from the inner wall of the housing 2 (see FIG. 10a). A central portion 11c is formed between the guiding slots 11a and 11b and it has a slightly arced shape and the outer walls of the central portion 11c are contacted and kept between the parallel inner walls of the two ribs 34a and 34b. The displacement of the actuator disc 6 is defined and limited by this special guiding between the parallel walls of the ribs 34a, 34b and the central portion 11c. The radial displacement of the actuator disc 6 takes place when the central portion 11c slides in radial direction between the parallel walls of the ribs 34a and 34b, and any angular displacement is a circular movement where the centre of the circle is the centre of the arced section of the central portion 11c. This guided movement will be illustrated in more details in connection with FIGS. 10-13. The thickness of the actuator disc 6 is smaller at a portion away from the guiding slots 11a, 11b, and this thinner part has a substantially horseshoe form and its upper plane surface constitutes a support 12 for the limiting element 5 placed thereon. In this support 12 there is a radial recess 13 that allows only radial movement for the limiting element 5 and prevents any angular rotation thereof. In the exploded view of FIG. 2 the bottom portion of the substantially horseshoe-shaped limiting element 5 can be seen, and a downwardly projecting linear guiding track 14 extends out of the central bottom portion of the element 5. The width of the guiding track 14 is loosely fitted in the radial recess 13 of the limiting element 5. From the rear portion of the upper surface of the limiting element 5 a short guiding pin 15 is extending out in upward direction and this allows the radial movement of the limiting element 5.

FIGS. 3 and 4 show from different view the way how the limiting element 5 can be placed on the support surface 12 of the actuator disc 6. From the support surface 12 of the actuator disc 6 the part with full thickness extends out and forms a horseshoe shape with two opposite parallel walls that terminate at respective opposite buffer surfaces 17 wherein the opposite walls widen by a slight step. These walls are symmetric to a central radial axis of the actuator disc 6. Past these narrow buffer surfaces the walls continue in the radial direction of arrow 16 and extend again in parallel to each other.

The limiting element 5 has a horseshoe-shaped open central recess between two curved arms, and the inner surface of the arms terminate at respective inner edges 18 and from there extend in outward direction until they reach the outer contour of the limiting element 5. The limiting element 5 is made by a material that allows flexible widening and narrowing of the arms e.g. by an appropriate plastic material. The radial displacement of the limiting element along the arrow 16 has two consecutive sections. In the first section the inner edges 18 do not yet reach the buffer surfaces 17 of the control disc 6. Along this first section the limiting element can be moved in radial direction without any resistance. When the movement of the arm 1 causes further radial displacement of the limiting element 5 and the inner edges 18 of its arms reach the buffer surfaces 17, then the first section with easy displacement is terminated because a braking effect will take place between the contacting inner edges 18 and the opposite buffer surfaces 17. The arms and the shape of the inner edges 18 and the opposite buffer surfaces are dimensioned so that upon overcoming a greater radial resistance, the arms open up and the limiting element 5 can be further moved in radial direction along the parallel walls past the buffer surfaces 17.

After overcoming of the higher resistance caused by the abutting force between the buffer surfaces 17 and the inner edges 18 the user of the cartridge will know just by having overcome the suddenly increasing force that a higher water flow rate has now been started and any further radial displacement of the actuator disc 6 will further increase the water stream. The need of exerting a higher force at the buffer position is the objective and basis of the eco-operation because as long as the buffer point has not been reached the actuator disc 2 can only be moved from its central closed position till a predetermined radial distance and this initial easy movement section corresponds to a small or medium water flow. In case the user wishes to use a higher water stream then he has to exert a higher force to overcome the resistance at the buffer point then the limiting element 5 will open up and thereafter the cartridge can be further opened in an easy way. The user sense therefore when the cartridge cannot be opened easily, and the water stream cannot be increased further in an unnoticed inadvertent way. In case the user wishes to generate a higher water stream then this can be done after he has overcome the higher resistance at the eco point. After the arms of the limiting element 5 have moved past the buffer surface 17 the further radial movement requires again a smaller force. It is important to note that the inner openings in the two ceramic discs i.e. of the control disc 7 and of the stationary disc 8 are designed so that at different rotation angles of the arm 1 in the plane normal to the axis 26 different radial positions can belong to identical mixed water flow rates. This property depends mainly on the flow rate characteristics defined by the ceramic discs. In connection with the eco function the user has a justified need that at the position when the higher resistance appears (i.e. at the eco position) the mixed water flow rate should remain always the same or nearly the same at any mixed water temperature. To meet this need the actuator disc 6 should be connected to the limiting element 5 in such a way that in every angular position thereof the buffer point should belong to a radial position of the actuator disc 6 where the mixed water flow rate is substantially the same. This objective is achieved by the presence of the guiding pin 15 that extends out from the rear upper surface of the limiting element 5 and the way how it is guided.

Figure 5:
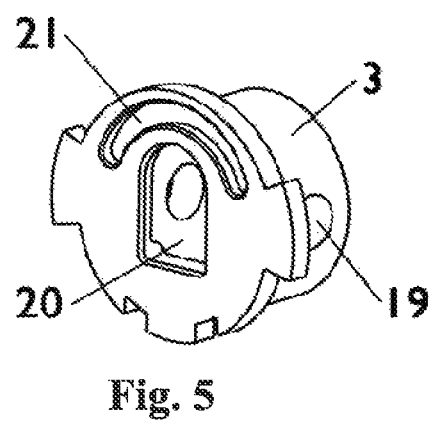
FIG. 5 shows the perspective view of the cartridge.
Figure 6:
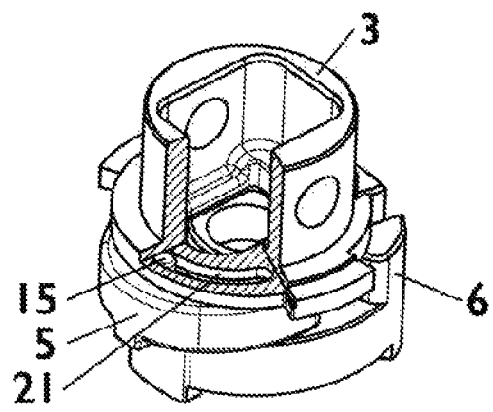
FIG. 6 is an enlarged assembled detail wherein the arm support is shown partially in section.

Reference is made now to FIGS. 5 and 6 which show the design of the lower part of the arm support 3 and the way how the limiting element 5 is guided. FIG. 5 shows the perspective view of the arm support 3. A transverse bore 19 is arranged in the neck portion of the arm support 3 in which the shaft 4 is pivotally fixed that allows tilting of the arm 1. Under the neck portion the bottom of the arm support 3 is wider. In the central part an opening 20 is provided which has a rectangular form elongated in radial direction and closed by respective arcs to provide sufficient space for the tilting of the arm 1. Under the effect of such a tilting movement the actuator disc 6 located underneath (see FIG. 1) is moved in radial direction. In the housing 2 the arm support 3 can be turned around the axis 26 within a predetermined angular range, and this turning movement takes place together with that of the arm 1.

In the wide bottom part of the arm support 3 an arced guiding recess 21 is provided, and the width of the recess 21 is sufficient to allow fitted insertion of the guiding pin 15 that projects in upward direction from the upper surface of the limiting element 5. In assembled state as shown in FIG. 6 the pin 15 is inserted in the guiding recess 21, and when the arm support 3 is turned around, then in each angle the radial position of the limiting element 5 (which is allowed to move only in radial direction) will be determined by the radial position of the guiding recess 21 taken at that particular angle. The shape of the arc of the guiding recess 21 should be chosen to correspond to the flow rate characteristic of the ceramic discs 7 and 8, and this ensures that the flow rate of the outflow water will be substantially the same at each angular position when the eco point (the abutment of the limiting element 5) is reached.

Figure 7A:
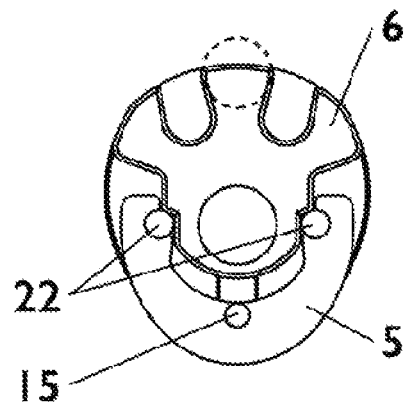
FIGS. 7a and 7b show the perspective view of two alternative embodiments.
Figure 7B:
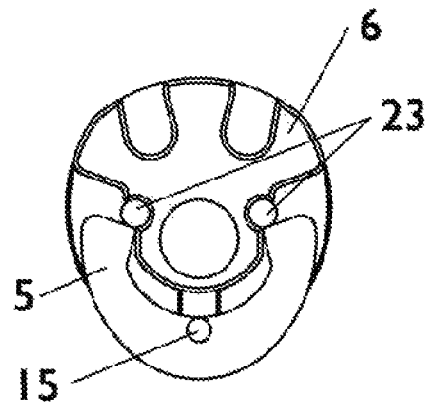

Reference is made now to FIGS. 7*a* and 7*b* that show an alternative embodiment how the abutment of the limiting element 5 is resolved. In the embodiment of FIG. 7*a* instead of the inner edge 18 shown in the previous embodiment respective rollers 22 are pivotally fixed to the ends of the arms of the U-shaped limiting element 5. The rollers 22 generate a similar abutment resistance to the actuator disc 6 as in the previous embodiment, but the resistance that should be overcome at the ECO position can be lighter, since the rollers 22 move apart the arms of the limiting element 5 then allow the further sliding along the parallel guiding walls of the actuator disc 6. FIG. 7*b* shows an inverted solution of the previous embodiment in which rollers 23 are pivotally fixed in the respective walls of the actuator disc 6. These rollers 23 also facilitate the opening of the two arms of the limiting element 5 when getting into engagement with the inner edges 18 of these arms.

Figure 8:
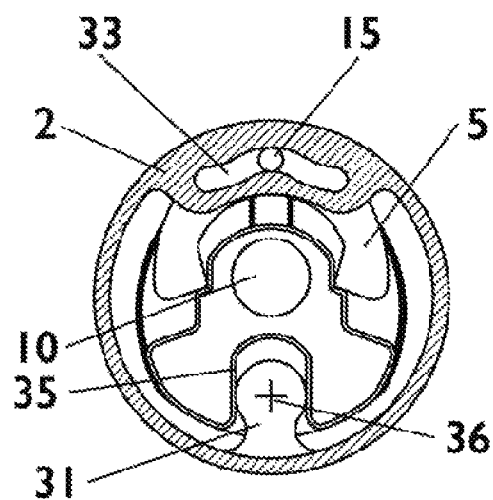
FIG. 8 shows the top view of an alternative way of guiding the actuator disc, partly in section.
Figure 9:
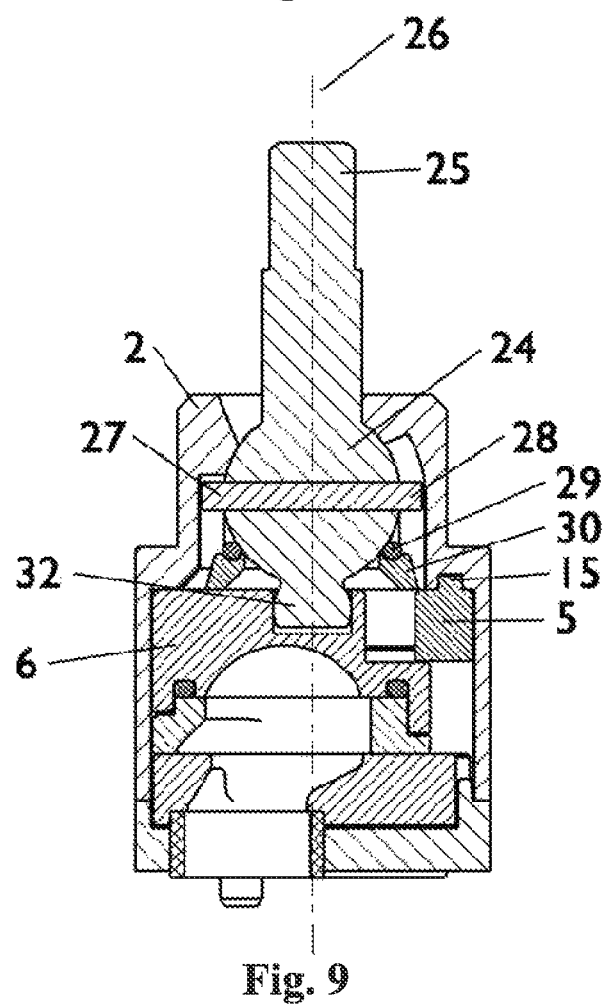
FIG. 9 shows the sectional elevation view of a joystick type cartridge.

FIGS. 8 and 9 show further embodiments of the cartridge according to the invention that can be moved similar to a joystick. The difference compared to the previous embodiments lies in the way how the actuator disc 6 is moved. In this embodiment the arm 25 has a spherical central part 24 which is guided in the housing 2 because the interior of the upper hollow part of the housing 2 forms a spherical cavity with a size fitted to the spherical central part 24 of the arm 25. The cartridge has the same vertical axis 26 as it was in the previous embodiments. Respective shafts 27, 28 extend out of the equatorial part of the spherical part 24, and the axis of these shafts 27, 28 is normal to the axis 26 when the cartridge is in its closed basic position. The spherical part 24 of the arm 25 is supported at its lower part by an O-ring 29 and a conforming hollow spherical support nest 30, and under the spherical part 24 the arm 25 ends in an actuator shaft 32. In the sectional view of FIG. 9 it can be observed that the tilting of the arm 25 around an axis normal to the plane of the drawing is possible only in a predetermined angular range, and the arm 25 cannot be turned around the vertical axis 26. In the present embodiment the arm 25 can be moved with two degrees of freedom, however, if the shafts 27, 28 are not used, a movement in three degrees of freedom would be possible. The actuator disc 6 is moved by the arced lower end of the shaft 32 which is inserted and fitted in the bore 10 of the actuator disc 6 which is open from above. During the movement of the arm 25 the height of the end of the shaft 32 is changed, but this shaft end cannot move out of the bore 10 because it has a sufficient depth to retain this shaft end.

The design and the arrangement of the limiting element 5 is the same as in the previous embodiment. Compared with the previous embodiment a difference in the embodiment shown in FIG. 8 lies in the guiding of the actuator disc 6 and of the limiting element 5. The guided movement of the actuator disc 6 is provided by the connection between an internal guiding head 31 that has a cylindrical part that extend out inwardly from the inner wall of the housing 2 and a guiding slot 35 that has two spaced parallel walls that surround the cylindrical part of the guiding head 31. The actuator disc 6 is moved by the displacement of the actuator shaft 32 that is inserted in the bore 10, but this movement is a guided one. The actuator disc 6 can be moved between the parallel walls of the guiding slot 35 around respective circular arc sections that have a centre 36 which is the centre of the cylindrical part of the guiding head 31, whereas it can also be moved in radial direction between the parallel walls of the guiding slot 35.

In the embodiment shown in FIG. 8 the radial position of the limiting element 5 is defined again by the position of the upwardly projecting pin 15, but this pin 15 is guided now by a recess 33 formed in the inner wall of the housing 2. The pin 15 is moved together with the actuator disc 6.

The movement of the actuator disc 6 and the ECO limiting effect provided by the limiting element 5 will now be shown in connection with FIGS. 10 to 16 *a* and *b*. The figures named by the letter "a" show schematically the actuator disc 6, and the contour of the housing 2 that encircles this disc 6, while the figures name by the letter "b" show the cartridge and the angular positions of the arm 25 closed with the vertical axis 26 in two planes.

In FIG. 10*a* the housing 2 is shown with the guiding recess 33 formed therein that receives the pin 15. The central bore 10 of the actuator disc 6 is moved by the arced head of the lower shaft 32 shown in FIG. 9 according to the momentary angular position of the arm 25. In FIG. 10*a* the housing 2 has two spaced inwardly projecting ribs 34*a* and 34*b* that extend in the maximum depth in the guiding slots 11*a* and 11*b* of the actuator disc 6, and in this position the water path in the cartridge is closed. Between the guiding slots 11*a* and 11*b* an arced guiding head 37 is formed that has a cylindrical outer surface that provide for the guided movement of the actuator disc 6. The length (depth) of the guiding ribs 34*a* and 34*b* is sufficiently large to limit and support the guiding head 37 formed between the guiding slots 11*a* and 11*b* even when the actuator disc 6 is in the most remote radial position from the initially closed position.

FIGS. 11 to 13 show the cartridge in the respective limiting positions in which the eco range is still on but any further increase of the water flow rate can be attained only be the flexible opening of the arms of the limiting element 5 that requires a higher force. In FIGS. 11*a* and 11*b* the cartridge is shown in the first angular end position from the centre when only cold water can flow. In FIGS. 12*a* and 12*b* the cold and warm water supply is the same, and in FIGS. 13*a* and 13*b* the second end position is shown when only warm water can flow.

In FIGS. 14 to 16 *a* and *b* the most open positions are shown past the eco points (that correspond to the highest water flow rate). FIGS. 14*a* and 14*b* correspond to fully open cold water flow, FIGS. 15*a* and 15*b* correspond to fully open equally mixed cold and hot water flow and FIGS. 16*a* and 16*b* correspond to fully open hot water flow.

In addition to the examples show several other embodiments can be realized, since the essence of the present solution is the planar movement of the actuator disc 6 and the limiting element 5 connected to it in such a way that within the control range the end of the eco function can be sensed by a suddenly increasing resistance force demand, and this increased force demand should take place in each water temperature substantially at the same water flow rate.

This condition can be realized by several designs of the housing, the arm and the nest, whereas it is clear that one edge of the actuator disc 6 will be limited by the interior wall of the housing and relative to this initial position the actuator disc can be moved within a substantially fan-tail like range in which it can take different radial and angular positions.

The materials other than the ceramic discs that can be used in the cartridge can be preferably plastic materials but any other materials like metals or metal foams can also be used.

Among the advantages of the invention it should be mentioned that the design and positioning of the limiting element 5 that changes its shape in a flexible way have been realized in such a way that the flexible displacement is much smaller than in the conventional designs and the water flow rate that corresponds to the end of the eco range can be controlled and adjusted so that this flow rate will be substantially the same at each selected water temperature. A further advantage lies in that the positioning of the limiting element 5 does not require excess space as it can be inserted in a cut (recess) of the actuator disc 6. A further advantage lies in that the realization of the eco function does not affect the design of the ceramic discs.

The invention claimed is:

1. A cartridge provided with ECO function for a single-armed mixing faucet, comprising:
    a cylindrical housing comprising a cylindrical inner cavity defined by a cylindrical inner wall that has a central axis;
    an arm comprising a first end extending out of the cylindrical housing and a second end configured as a shaft, wherein the arm can be moved relative to the housing with at least two degrees of freedom;
    an actuator disc arranged in the housing configured to move in a plane normal to the axis, a bore being defined in a central portion of a first side of the actuator disc that is configured to be open in the direction of the arm and configured to receive the shaft, wherein the arm is operationally coupled to the actuator disc such that movement of the arm causes movement of the actuator disc in said plane;
    a ceramic control disc coupled at one side to the actuator disc, wherein the ceramic control disc and the control disc are on opposite planar surfaces of the actuator disc;
    a ceramic stationary disc having a planar face coupled to the planar face of the ceramic control disc such that a planar face of the ceramic control disc, in which the planar face is normal to the axis, can be moved along the plane of said faces relative to the stationary disc;
    a base coupled to a side of the stationary disc opposite to the planar face, the base has a cold water inlet, a warm water inlet and a mixed water outlet,
    wherein the actuator disc and the control disc coupled to the actuator disc are configured to move along said plane by the movement of the arm and this movement comprises a circular rotation component around a center adjacent to the inner wall of the housing in a limited angular range and a radial component, wherein the radial component of the movement of the control disc defines the flow rate of the mixed water outflow and the angular position defines the temperature of the mixed water; and
    ECO elements that partially prevent further radial displacement of the control disc after reaching a predetermined radial position wherein further radial displacement of the control disc is prevented,
    wherein the actuator disc comprises a pair of parallel planar walls that extend beyond said bore and in the direction of the radial component of the movement of the actuator disc in the central part of said angular range, and the spacing between these walls decreases in a pair of short transition zones at a predetermined intermediate distance from the center of rotation of the actuator disc, and the transition zones form respective buffer surfaces; and said ECO elements comprise an arced limiting element comprised of a resilient material and comprising a pair of spaced arms that engage and are guided by said parallel walls, the limiting element being configured to move only in a radial direction relative to the actuator disc, and the radial position of the limiting element is defined by a guiding path connected to the housing, and the limiting element being configured to move in the radial direction with respect to the actuator disc with minimal force force in a first radial zone lasting till said transition zones, and when the limiting element is moved further in radial direction with respect to the actuator disc, the force used to move the limiting element has to first overcome the resistance of opening the arms along the transition zone when being guided by the parallel walls in the range wherein the spacing between the walls is greater.

2. The cartridge as claimed in claim 1, wherein the guiding of the limiting element with respect to the housing ensures that, in each temperature controlling angular position of the arm around the axis, the transition zone is associated with substantially the same mixed water flow rate.

3. The cartridge as claimed in claim 1, wherein the actuator disc comprises a first area with a first thickness and a second area with a second thickness, said second area being defined from the first area by parallel walls, wherein the first thickness is less than the second thickness and the difference in thickness between the first thickness and the second thickness is at least as large as a thickness of the limiting element, and the first area defines a support surface for holding a side of the limiting element.

4. The cartridge as claimed in claim 3, wherein a radial recess is provided in the actuator disc at the central portion of the support surface, and a guiding track extends out of the limiting element that is fitted in and guided by the radial recess and the radial recess is configured to allow the limiting element to be moved in one radial direction.

5. The cartridge as claimed in claim 4, wherein from the surface of the limiting element which is opposite to the guiding track a pin extends out, and the pin is fitted in and guided by a guiding recess connected to the housing.

6. The cartridge as claimed in claim 1, comprising respective rollers realizing the required transitional resistance and being placed either at the end portions of the arms of the limiting element facing towards the buffer surfaces or being sunk in the spaced walls of the actuator disc at or close to the buffer surfaces.

7. The cartridge as claimed in claim 1, wherein the housing has a cylindrical portion which has a smaller diameter than other parts thereof, and the arm is held in this portion, an arm support is arranged in the interior of the cylindrical portion, the arm has respective shafts that extend out across the arm in both sides in a direction normal to the axis, the arm support has respective bores in which said shafts are inserted, the arm support can be turned around the axis in a first predetermined angular range, and the arm can be turned around the shafts in a second predetermined angular range, and under the arm support the lower end of the arm is fitted in the bore of the actuator disc.

8. The cartridge as claimed in claim 7, wherein the arm support has a wider bottom part which is arranged adjacent to the actuator disc, and an arced guiding recess is provided in this bottom part, and an upper guiding pin of the limiting element is fitted and guided in this recess.

9. The cartridge as claimed in in claim 1, wherein the housing has a hollow portion that is configured to receive the arm and this hollow portion has a spherical design, and a corresponding portion of the arm has a spherical central part fitting in the hollow part, and the bottom of the spherical central part facing the actuator disc is supported by a nest and in given cases also supported by an O ring, and over the spherical part the arm ends in an actuator shaft that is fitted in the bore of the actuator disc and causes movement thereof.

10. The cartridge as claimed in claim 9, wherein in the internal hollow part of the housing closely above the actuator disc a narrow arced shoulder is provided and a recess is made in this shoulder in which an upper guiding pin is inserted, and the recess defines the radial position of the limiting element.

11. The cartridge as claimed in claim 1, wherein a plurality of spaced ribs extend inwardly from the inner wall of the housing that extend parallel to the direction of a central radius, and in the actuator disc opposite to the ribs respective guiding slots are provided into which the ribs are inserted, and between the guiding slots an arced guiding head is provided that fits to the spacing between the ribs and allows limited turning the actuator disc around its center.

12. The cartridge as claimed in claim 1, wherein in the guided connection between the inner wall of the housing and the actuator disc a guiding head is provided that extends inwardly from the inner wall of the housing and a guiding slot is provided in the actuator disc that has spaced parallel walls, and in which said guiding head is inserted and guided.

* * * * *